United States Patent
Maguire et al.

(10) Patent No.: US 12,275,298 B2
(45) Date of Patent: Apr. 15, 2025

(54) TRACTION BATTERY PACKS WITH CELL-TO-PACK BATTERY SYSTEMS HOUSED WITHIN IRREGULARLY SHAPED ENCLOSURES

(71) Applicant: FORD GLOBAL TECHNOLOGIES, LLC, Dearborn, MI (US)

(72) Inventors: Patrick Daniel Maguire, Ann Arbor, MI (US); Che-Chun Chang, Ann Arbor, MI (US); Jason C. Marcath, Dearborn, MI (US); Karen Siler, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 319 days.

(21) Appl. No.: 17/893,548

(22) Filed: Aug. 23, 2022

(65) Prior Publication Data
US 2023/0302887 A1 Sep. 28, 2023

Related U.S. Application Data

(60) Provisional application No. 63/322,766, filed on Mar. 23, 2022.

(51) Int. Cl.
| | |
|---|---|
| *B60K 1/04* | (2019.01) |
| *B60L 50/64* | (2019.01) |
| *H01M 10/04* | (2006.01) |
| *H01M 50/198* | (2021.01) |
| *H01M 50/204* | (2021.01) |

(52) U.S. Cl.
CPC ............... *B60K 1/04* (2013.01); *B60L 50/64* (2019.02); *H01M 10/0481* (2013.01); *H01M 50/198* (2021.01); *H01M 50/204* (2021.01); *H01M 2220/20* (2013.01)

(58) Field of Classification Search
CPC .................... B60K 1/04; B60K 2001/0438
See application file for complete search history.

(56) References Cited

U.S. PATENT DOCUMENTS

| | | | | |
|---|---|---|---|---|
| 6,040,080 | A * | 3/2000 | Minami | H01M 50/202 |
| | | | | 429/96 |
| 6,227,322 | B1 * | 5/2001 | Nishikawa | B60R 16/04 |
| | | | | 180/68.5 |
| 8,089,248 | B2 | 1/2012 | Tabatowski-Bush | |

(Continued)

FOREIGN PATENT DOCUMENTS

| CN | 101860053 A | 10/2010 |
|---|---|---|
| CN | 101860053 B | 4/2015 |

(Continued)

*Primary Examiner* — Brian L Swenson
(74) *Attorney, Agent, or Firm* — David B. Kelley; Carlson, Gaskey & Olds, P.C.

(57) ABSTRACT

Traction battery packs are disclosed that include cell-to-pack battery systems. A cell stack/cell matrix of the cell-to-pack battery system may be positioned within an irregularly shaped enclosure tray of the traction battery pack. A block insert may be positioned at an interface between the cell stack/cell matrix and an irregularly shaped interior surface of the enclosure tray. The block insert may be configured to facilitate insertion of the cell stack/cell matrix into the enclosure tray, transfer compression loads from the enclosure tray walls to the cell stack/cell matrix, resist battery cell compression loads, etc.

18 Claims, 5 Drawing Sheets

(56) References Cited

U.S. PATENT DOCUMENTS

| | | | |
|---|---|---|---|
| 8,960,350 B2* | 2/2015 | Kosaki | H01M 10/44 |
| | | | 180/68.5 |
| 8,968,912 B2 | 3/2015 | Maguire et al. | |
| 9,217,781 B2 | 12/2015 | Tabatowski-Bush et al. | |
| 9,425,628 B2 | 8/2016 | Pham et al. | |
| 9,437,871 B2 | 9/2016 | Zhou et al. | |
| 9,446,680 B2 | 9/2016 | Chen et al. | |
| 9,515,357 B2 | 12/2016 | Haskins et al. | |
| 9,799,932 B2 | 10/2017 | Haskins et al. | |
| 10,109,897 B2 | 10/2018 | Haskins et al. | |
| 10,230,083 B2 | 3/2019 | Maguire et al. | |
| 10,566,647 B2 | 2/2020 | Andryukov et al. | |
| 10,601,006 B2 | 3/2020 | Maguire et al. | |
| 10,608,222 B2 | 3/2020 | Montgomery et al. | |
| 10,759,281 B2 | 9/2020 | Miller et al. | |
| 10,784,495 B2 | 9/2020 | Fernandez-Galindo et al. | |
| 11,005,131 B2 | 5/2021 | Zhou et al. | |
| 11,024,913 B2 | 6/2021 | Subramanian et al. | |
| 11,050,125 B1 | 6/2021 | Zhu et al. | |
| 11,114,726 B2 | 9/2021 | Gu et al. | |
| 11,128,009 B2 | 9/2021 | Chen et al. | |
| 11,139,537 B2 | 10/2021 | Wu et al. | |
| 11,217,847 B2 | 1/2022 | Eftekhari et al. | |
| 11,258,119 B2 | 2/2022 | Wang et al. | |
| 11,264,669 B2 | 3/2022 | Jiang | |
| 11,283,130 B2 | 3/2022 | Chen et al. | |
| 11,289,750 B2 | 3/2022 | Zhou et al. | |
| 11,302,972 B2 | 4/2022 | Chu et al. | |
| 11,302,973 B2 | 4/2022 | Maguire et al. | |
| 11,302,990 B2 | 4/2022 | Huang et al. | |
| 11,329,347 B2 | 5/2022 | Huang et al. | |
| 11,335,960 B2 | 5/2022 | Wang et al. | |
| 11,362,392 B2 | 6/2022 | Wang et al. | |
| 11,362,393 B2* | 6/2022 | Wang | H01M 50/262 |
| 11,387,519 B2 | 7/2022 | Huang et al. | |
| 11,404,744 B1 | 8/2022 | Yang et al. | |
| 11,417,932 B2 | 8/2022 | Tang et al. | |
| 11,417,936 B2 | 8/2022 | Wang et al. | |
| 11,450,912 B2* | 9/2022 | Maryanski | B60L 50/64 |
| 2010/0259221 A1 | 10/2010 | Tabatowski-Bush | |
| 2013/0164592 A1 | 6/2013 | Maguire et al. | |
| 2017/0104251 A1 | 4/2017 | Wang | |
| 2017/0313170 A1* | 11/2017 | Hara | B60L 50/66 |
| 2019/0305389 A1 | 10/2019 | Poirier et al. | |
| 2020/0083502 A1* | 3/2020 | Fan | H01M 10/482 |
| 2020/0091494 A1 | 3/2020 | Fernandez-Galindo et al. | |
| 2020/0203684 A1 | 6/2020 | Chen et al. | |
| 2020/0203779 A1 | 6/2020 | Wang et al. | |
| 2020/0212387 A1 | 7/2020 | Su et al. | |
| 2020/0212397 A1 | 7/2020 | Wang et al. | |
| 2020/0212418 A1 | 7/2020 | Chen et al. | |
| 2020/0381697 A1 | 12/2020 | Fernandez-Galindo et al. | |
| 2021/0066686 A1 | 3/2021 | Siewert et al. | |
| 2021/0091348 A1 | 3/2021 | Lateef et al. | |
| 2021/0091437 A1 | 3/2021 | Chen et al. | |
| 2021/0104798 A1 | 4/2021 | Jiang et al. | |
| 2021/0119193 A1 | 4/2021 | Eftekhari et al. | |
| 2021/0119279 A1 | 4/2021 | Wang et al. | |
| 2021/0218117 A1 | 7/2021 | Zhu et al. | |
| 2021/0226274 A1 | 7/2021 | Negrete et al. | |
| 2021/0229541 A1 | 7/2021 | Smith et al. | |
| 2021/0305641 A1 | 9/2021 | Bai et al. | |
| 2021/0305642 A1 | 9/2021 | Bai et al. | |
| 2021/0320349 A1 | 10/2021 | Jiang et al. | |
| 2021/0320372 A1 | 10/2021 | Jiang et al. | |
| 2021/0402863 A1 | 12/2021 | Huang et al. | |
| 2021/0408634 A1 | 12/2021 | Yin et al. | |
| 2022/0052414 A1 | 2/2022 | Huang et al. | |
| 2022/0052415 A1 | 2/2022 | Huang et al. | |
| 2022/0059897 A1 | 2/2022 | Huang et al. | |
| 2022/0059902 A1 | 2/2022 | Jiang et al. | |
| 2022/0077521 A1 | 3/2022 | Jin et al. | |
| 2022/0085450 A1 | 3/2022 | Chu et al. | |
| 2022/0102800 A1 | 3/2022 | Wang et al. | |
| 2022/0109211 A1 | 4/2022 | Wang et al. | |
| 2022/0123394 A1 | 4/2022 | Zhang et al. | |
| 2022/0123423 A1 | 4/2022 | Wang et al. | |
| 2022/0149458 A1 | 5/2022 | Jiang et al. | |
| 2022/0158296 A1 | 5/2022 | Chen et al. | |
| 2022/0185088 A1 | 6/2022 | Zhang et al. | |
| 2022/0190416 A1 | 6/2022 | Wu | |
| 2022/0190423 A1 | 6/2022 | Wu et al. | |
| 2022/0216555 A1 | 7/2022 | Huang et al. | |
| 2022/0221084 A1 | 7/2022 | Huang et al. | |
| 2022/0231370 A1 | 7/2022 | Yang et al. | |
| 2022/0231371 A1 | 7/2022 | Jiang et al. | |
| 2022/0255172 A1 | 8/2022 | Guo et al. | |
| 2022/0416351 A1* | 12/2022 | Baseri | H01M 50/517 |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104229 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 110416448 A | 11/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331997 B | 11/2021 |
| CN | 113871789 A | 12/2021 |
| CN | 112310541 B | 3/2022 |
| CN | 216054919 U | 3/2022 |

(56) References Cited

FOREIGN PATENT DOCUMENTS

| | | |
|---|---|---|
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |
| CN | 216750072 U | 6/2022 |
| CN | 216750142 U | 6/2022 |
| CN | 216872085 U | 7/2022 |
| CN | 216903107 U | 7/2022 |
| CN | 216903128 U | 7/2022 |
| CN | 216903497 U | 7/2022 |
| DE | 102016119118 A1 | 4/2017 |
| DE | 102017121796 A1 | 3/2018 |
| DE | 102019108631 A1 | 10/2019 |
| DE | 102019125140 A1 | 3/2020 |
| DE | 102020124986 A1 | 3/2021 |
| DE | 102021101385 A1 | 9/2021 |
| EP | 3671904 A1 | 6/2020 |
| EP | 3671940 A1 | 6/2020 |
| EP | 3672377 A1 | 6/2020 |
| EP | 3675204 A1 | 7/2020 |
| EP | 3675207 A1 | 7/2020 |
| EP | 3675216 B1 | 7/2020 |
| EP | 3675217 A1 | 7/2020 |
| EP | 3675220 A1 | 7/2020 |
| EP | 3675221 A1 | 7/2020 |
| EP | 3675236 A1 | 7/2020 |
| EP | 3675271 A1 | 7/2020 |
| EP | 3798491 A1 | 3/2021 |
| EP | 3799150 A1 | 3/2021 |
| EP | 3799151 A1 | 3/2021 |
| EP | 3905366 A1 | 3/2021 |
| EP | 3806231 A1 | 4/2021 |
| EP | 3852187 A1 | 7/2021 |
| EP | 3920255 A1 | 8/2021 |
| EP | 3883005 A1 | 9/2021 |
| EP | 3883006 A1 | 9/2021 |
| EP | 3883042 A1 | 9/2021 |
| EP | 3886198 A1 | 9/2021 |
| EP | 3886200 A1 | 9/2021 |
| EP | 3886201 A1 | 9/2021 |
| EP | 3671893 B1 | 11/2021 |
| EP | 3699979 B1 | 11/2021 |
| EP | 3920315 A1 | 12/2021 |
| EP | 3930027 A1 | 12/2021 |
| EP | 3944397 A1 | 1/2022 |
| EP | 3944398 A1 | 1/2022 |
| EP | 3955333 A1 | 2/2022 |
| EP | 3799194 B1 | 3/2022 |
| EP | 3985787 A1 | 4/2022 |
| EP | 3799153 B1 | 6/2022 |
| IN | 112331981 B | 9/2021 |
| JP | 2010246372 A | 10/2010 |
| KR | 1020100112530 A | 10/2010 |
| KR | 101695641 B1 | 1/2017 |

\* cited by examiner

TRACTION BATTERY PACKS WITH CELL-TO-PACK BATTERY SYSTEMS HOUSED WITHIN IRREGULARLY SHAPED ENCLOSURES

CROSS-REFERENCE TO RELATED APPLICATIONS

This disclosure claims priority to U.S. Provisional Application No. 63/322,766, which was filed on Mar. 23, 2022 and is incorporated herein by reference.

TECHNICAL FIELD

This disclosure relates generally to traction battery packs, and more particularly to traction battery packs that include a cell-to-pack battery system housed within an irregularly shaped enclosure assembly.

BACKGROUND

Electrified vehicles include a drivetrain having one or more electric machines. The electric machines can drive the electrified vehicles instead of, or in addition to, an internal combustion engine. A traction battery pack can power the electric machines and other electrical loads of the vehicle.

Conventional traction battery packs include groupings of battery cells called battery arrays. The battery arrays include various array support structures (e.g., array frames, spacers, rails, walls, end plates, bindings, etc.) that are arranged for grouping and supporting the battery cells in multiple individual units inside the traction battery pack enclosure.

SUMMARY

A traction battery pack according to an exemplary aspect of the present disclosure includes, among other things, an enclosure assembly including an enclosure tray. The enclosure tray includes an irregularly shaped interior surface. A cell-to-pack battery system is housed within the enclosure assembly and includes a cell stack. A block insert establishes an interface between the irregularly shaped interior surface and the cell stack.

In a further non-limiting embodiment of the forging traction battery pack, the block insert is secured to a battery cell that is located at a longitudinal extent of the cell stack.

In a further non-limiting embodiment of either of the foregoing traction battery packs, the cell stack establishes a cell row of a cell matrix.

In a further non-limiting embodiment of any of the foregoing traction battery packs, the enclosure tray provides a cell-compressing opening for compressing the cell stack.

In a further non-limiting embodiment of any of the foregoing traction battery packs, the irregularly shaped interior surface establishes part of the cell-compressing opening.

In a further non-limiting embodiment of any of the foregoing traction battery packs, the block insert includes a first side face that interfaces with the irregularly shaped interior surface and a second sides face that interfaces with the cell stack.

In a further non-limiting embodiment of any of the foregoing traction battery packs, the first side surface includes a first profile and the second side surface includes a second, different profile.

In a further non-limiting embodiment of any of the foregoing traction battery packs, the first profile is curved and the second profile is flat.

In a further non-limiting embodiment of any of the foregoing traction battery packs, an adhesive is disposed between the first side surface and the irregularly shaped interior surface and further between the second side surface and the cell stack.

In a further non-limiting embodiment of any of the foregoing traction battery packs, the irregularly shaped interior surface includes a curved profile and connects between flat portions of the enclosure tray.

In a further non-limiting embodiment of any of the foregoing traction battery packs, the block insert is a polymer-based component.

In a further non-limiting embodiment of any of the foregoing traction battery packs, the polymer-based component includes a hollow core polymer having a structural ribbing.

A method according to another exemplary aspect of the present disclosure includes, among other things, positioning a block insert between an irregularly shaped interior surface of an enclosure tray of a traction battery pack and a cell stack of a cell-to-pack battery system of the traction battery pack.

In a further non-limiting embodiment of the forgoing method, the block insert is positioned between the irregularly shaped interior surface and a battery cell of the cell stack.

In a further non-limiting embodiment of either of the foregoing methods, the cell stack is part of a cell matrix of the cell-to-pack battery system.

In a further non-limiting embodiment of any of the foregoing methods, the block insert is secured to both the irregularly shaped interior surface and the battery cell by an adhesive.

In a further non-limiting embodiment of any of the foregoing methods, the block insert includes a first side face that interfaces with the irregularly shaped interior surface and a second side face that interfaces with the cell stack.

In a further non-limiting embodiment of any of the foregoing methods, the block insert includes a first end face that interfaces with a flat portion of the enclosure tray and a second end face that interfaces with the cell stack or a second cell stack.

In a further non-limiting embodiment of any of the foregoing methods, the first side surface includes a first profile and the second side surface includes a second, different profile.

In a further non-limiting embodiment of any of the foregoing methods, the first profile is curved and the second profile is flat.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details traction battery packs that include cell-to-pack battery systems. A cell stack/cell matrix of the cell-to-pack battery system may be positioned within an irregularly shaped enclosure tray of the traction battery pack. A block insert may be positioned at an interface between the cell stack/cell matrix and an irregularly shaped interior surface of the enclosure tray. The block insert may be configured to facilitate insertion of the cell stack/cell matrix into the enclosure tray, transfer compression loads from the enclosure tray walls to the cell stack/cell matrix, resist battery cell compression loads, etc. These and other features are discussed in greater detail in the following paragraphs of this detailed description.

Figure 1:
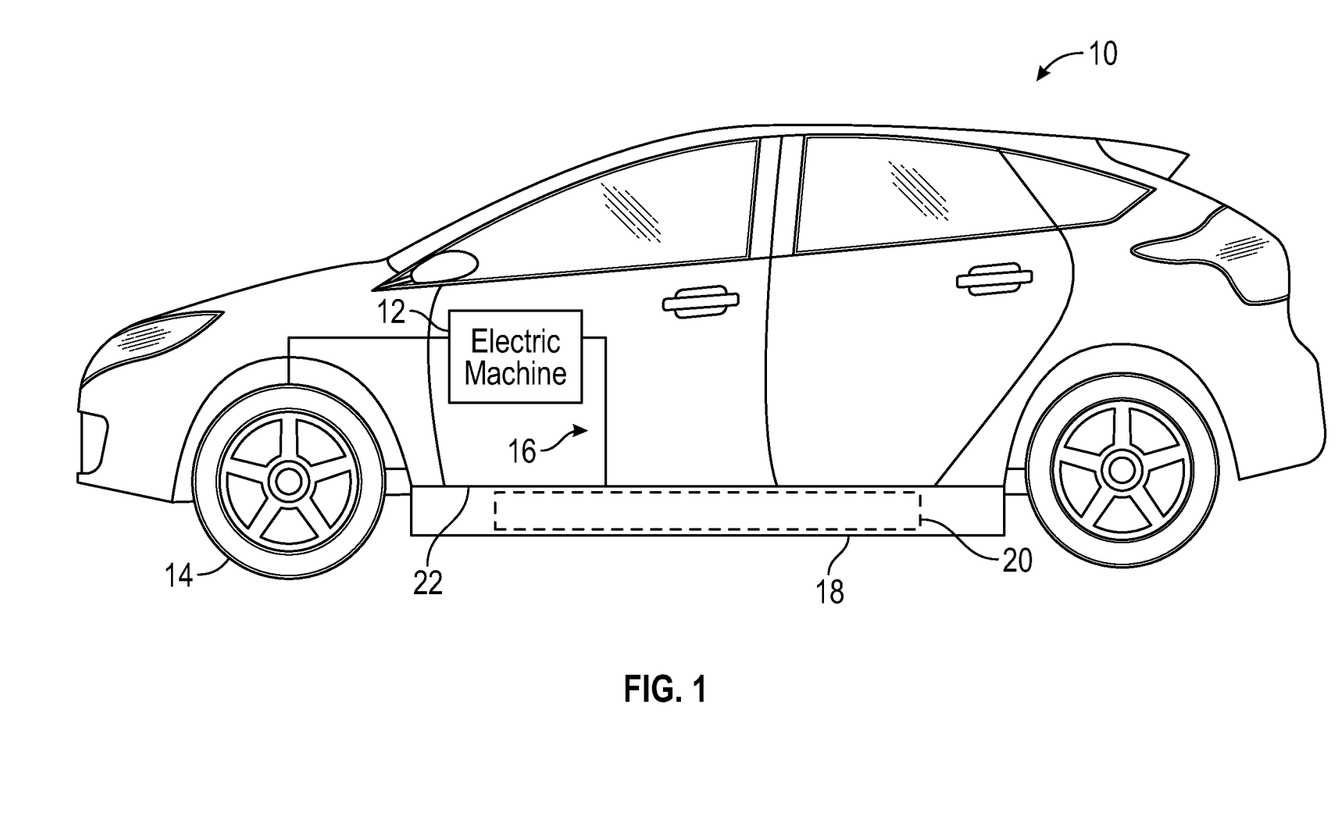
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in the exemplary embodiment, the electrified vehicle 10 could be equipped with an internal combustion engine that can be employed either alone or in combination with other power sources to propel the electrified vehicle 10.

In an embodiment, the electrified vehicle 10 is a car. However, the electrified vehicle 10 could alternatively be a pickup truck, a van, a sport utility vehicle (SUV), or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without assistance from an internal combustion engine. The electric machine 12 may operate as an electric motor, an electric generator, or both. The electric machine 12 receives electrical power and can convert the electrical power to torque for driving one or more drive wheels 14 of the electrified vehicle 10.

A voltage bus 16 may electrically couple the electric machine 12 to a traction battery pack 18. The traction battery pack 18 is capable of outputting electrical power to power the electric machine 12 and/or other electrical loads of the electrified vehicle 10.

The traction battery pack 18 may be secured to an underbody 22 of the electrified vehicle 10. However, the traction battery pack 18 could be located elsewhere on the electrified vehicle 10 within the scope of this disclosure.

The traction battery pack 18 is an exemplary electrified vehicle battery. The traction battery pack 18 may be a high voltage traction battery pack that includes a cell-to-pack battery system 20. Unlike conventional traction battery pack battery systems, the cell-to-pack battery system 20 incorporates battery cells or other energy storage devices without the cells being arranged in individual arrays or modules. The cell-to-pack battery system 20 therefore eliminates most if not all the array support structures (e.g., array frames, spacers, rails, walls, end plates, bindings, etc.) necessary for grouping the battery cells into the arrays/modules. Further, the cell-to-pack battery system 20 may provide the total high voltage bus electrical potential of the traction battery pack 18 with a single battery unit as opposed to conventional battery systems that require multiple individual battery arrays/modules that must be connected together after being positioned within the battery enclosure for achieving the total high voltage electrical potential.

Figure 2:
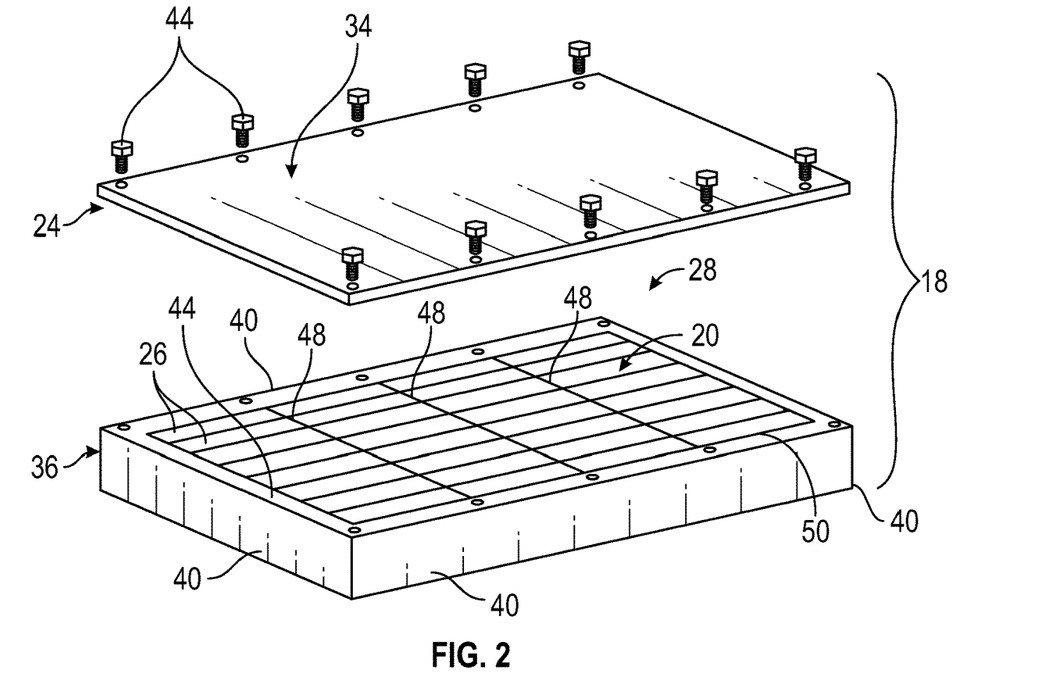
FIG. 2 illustrates a traction battery pack of the electrified vehicle of FIG. 1.
Figure 3:
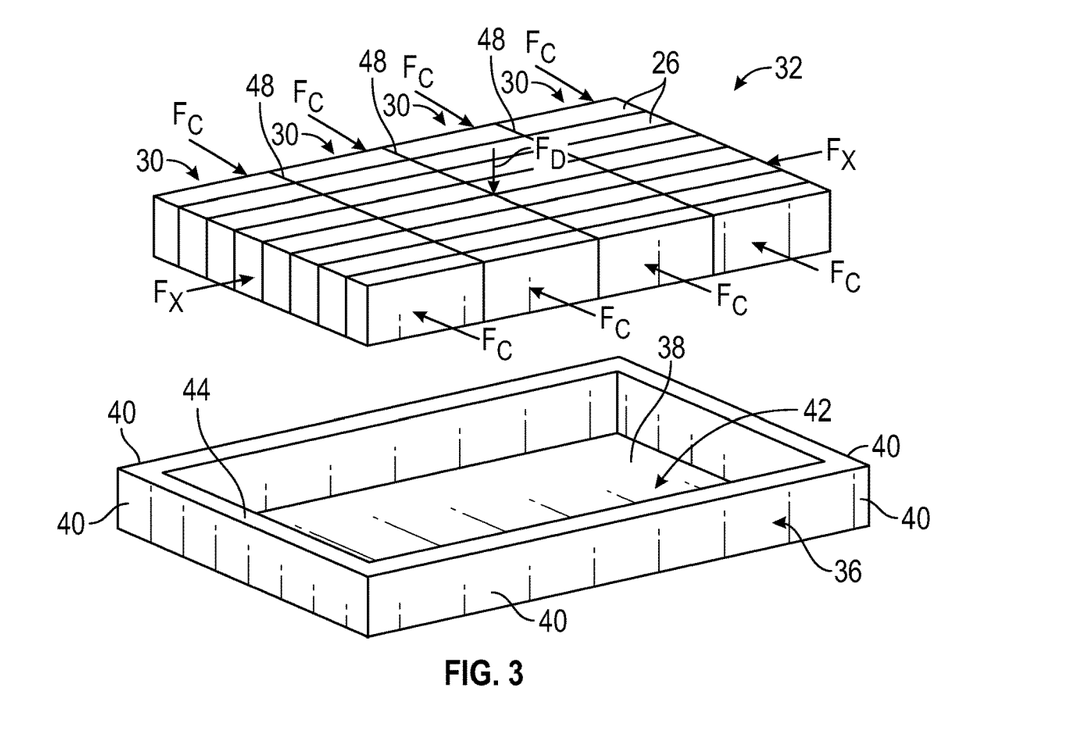
FIG. 3 illustrates a cell-to-pack battery system of the traction battery pack of FIG. 2.

Referring now to FIGS. 2 and 3, the traction battery pack 18 may include an enclosure assembly 24 that is arranged for housing the cell-to-pack battery system 20. In an embodiment, the cell-to-pack battery system 20 includes a plurality of battery cells 26 that are held within an interior area 28 established by the enclosure assembly 24.

The battery cells 26 may supply electrical power to various components of the electrified vehicle 10. The battery cells 26 may be stacked side-by-side relative to one another to construct a cell stack 30, and the cell stacks 30 may be positioned side-by-side in rows to provide a cell matrix 32.

In an embodiment, each cell stack 30 includes eight individual battery cells 26, and the cell matrix 32 includes four cell stacks 30 for a total of thirty-two battery cells 26. Providing an even quantity of battery cells 26 and an even quantity of cell stacks 30 can help to support an efficient electrical bussing arrangement. Although a specific number of battery cells 26 and cells stacks 30 are illustrated in the various figures of this disclosure, the cell-to-pack battery system 20 of the traction battery pack 18 could include any number of battery cells 26 and any number of cell stacks 30. In other words, this disclosure is not limited to the exemplary configuration shown in FIGS. 2 and 3.

In an embodiment, the battery cells 26 are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The enclosure assembly 24 of the traction battery pack 18 may include an enclosure cover 34 and an enclosure tray 36. The enclosure cover 34 may be secured to the enclosure tray 36 to provide the interior area 28 for housing the cell-to-pack battery system 20.

The enclosure tray 36 may include a floor 38 and a plurality of side walls 40 arranged relative to one another to provide a cell-compressing opening 42. The floor 38 and the side walls 40 may be mechanically coupled to one another, such as by welding, for example.

During assembly of the traction battery pack 18, the enclosure cover 34 may be secured to the enclosure tray 36 at an interface 44 that substantially circumscribes the interior area 28. In some implementations, mechanical fasteners 46 may be used to secure the enclosure cover 34 to the enclosure tray 36, although other fastening methodologies (adhesion, etc.) could also be suitable.

The cell matrix 32 of the cell-to-pack battery system 20 may be positioned within the cell-compressing opening 42 provided by the enclosure tray 36. The exemplary enclosure tray 36 is depicted as including a single cell-compressing opening 42, however it should be understood that this disclosure extends to structural assemblies that provide one or more cell-compressing openings. The enclosure cover 34 may cover the cell matrix 32 within the cell-compressing opening 42 to substantially surround the battery cells 26 on all sides. Once fully assembled and positioned relative to the enclosure tray 36, the cell matrix 32 may establish a single battery unit capable of providing the total high voltage bus electrical potential of the traction battery pack 18.

The enclosure tray 36 may compress and hold the cell matrix 32 when the cell matrix 32 is received within the cell-compressing opening 42. In an embodiment, the side walls 40 of the enclosure tray 36 apply forces to the cell matrix 32 when the cell matrix 32 is positioned within the cell-compressing opening 42.

In an embodiment, in order to insert the cell matrix 32 into the cell-compressing opening 42, the cell matrix 32 may first be compressed, and then, while compressed, moved into place in the cell-compressing opening 42. A compressive force $F_C$ may be applied to opposed ends of one of the cell stacks 30. The compressive force $F_C$ essentially squeezes the battery cells 26 within the cell stack 30, thereby compressing the cell stack 30 and the individual battery cells 26 to a reduced thickness. While the compressive force $F_C$ is applied to the cell stack 30, the cell stack 30 may be inserted into a respective cell-compressing opening 42 by a downward force $F_D$. The downward force $F_D$ may be applied directly to one or more of the battery cells 26.

While the term "downward" is used herein to describe the downward force $F_D$, it should be understood that the term "downward" is used herein to refer to all forces tending to press a cell stack 30 into a cell-compressing opening 42. In particular, the term "downward" refers to all forces substantially perpendicular to the compressive forces $F_C$, whether or not the force is truly in a "downward" direction. For example, this disclosure extends to cell stacks that are compressed and inserted into a cell-compressing opening in a sideways direction.

The cell stacks 30 could be individually compressed and inserted into the cell-compressing opening 42. In another embodiment, the entire cell matrix 32 is compressed and inserted into the cell-compressing opening 42. As schematically shown in FIG. 3, in such an embodiment, additional compressive forces $F_X$ can compress the cell stacks 30 together for insertion of the cell matrix 32 into the cell-compressing opening 42. The compressive forces $F_X$ are generally perpendicular to the compressive forces $F_C$. The compressive forces $F_X$ may be applied together with the compressive forces $F_C$. The force $F_D$ may then be applied to move the entire cell matrix 32 into the cell-compressing opening 42.

In an embodiment, an entire perimeter of the cell-compressing opening 42 is defined by the side walls 40 of the enclosure tray 36. The side walls 40 can apply a compressive force to the battery cells 26 about the entire perimeter of the cell matrix 32. The side walls 40 may therefore function as a rigid halo-type structure that compresses and tightly holds the cell matrix 32.

The configuration described above is considered to be a cell-to-pack type battery pack, which differs from conventional battery pack types that include enclosures holding arrays of battery cells enclosed by array support structures that are spaced apart from walls of a battery enclosure, and where the battery enclosure does not apply compressive forces to any of the battery cells. The cell-to-pack type battery pack described herein also eliminates the rigid cross members that are commonly secured to the enclosure tray of conventional traction battery backs for providing mounting points for securing the battery arrays and the enclosure cover.

The cell-to-pack battery system 20 may further include one or more cell row separators 48. In an embodiment, one cell row separator 48 is positioned between each adjacent pair of cell stacks 30 of the cell matrix 32. In other embodiments, two cell row separators 48 are provided with each cell stack 30. However, the total number of cell row separators 48 provided within the cell-to-pack battery system 20 is not intended to limit this disclosure.

Figure 4:
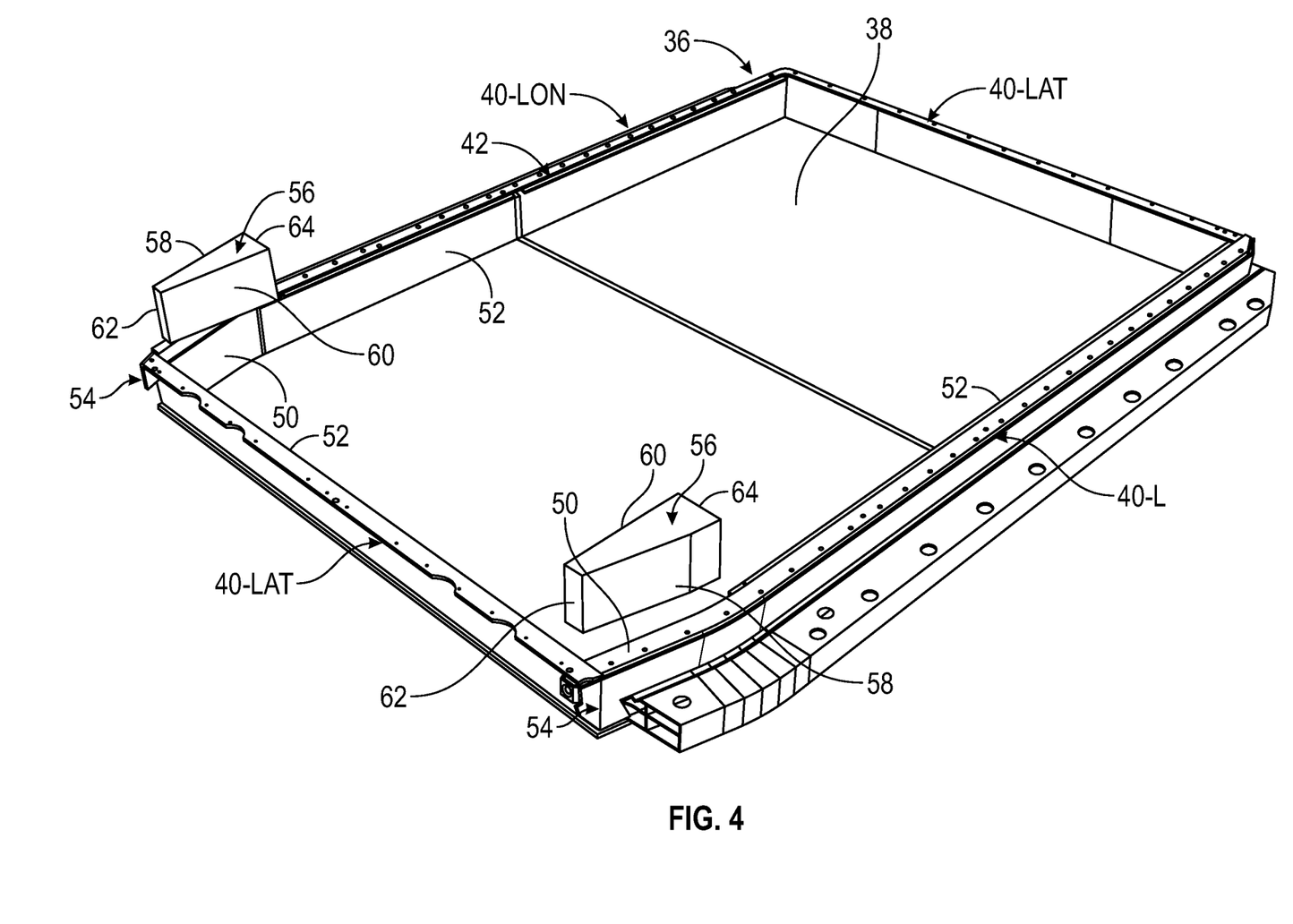
FIG. 4 is a partially exploded view of a traction battery pack having an irregularly shaped enclosure tray.
Figure 5:
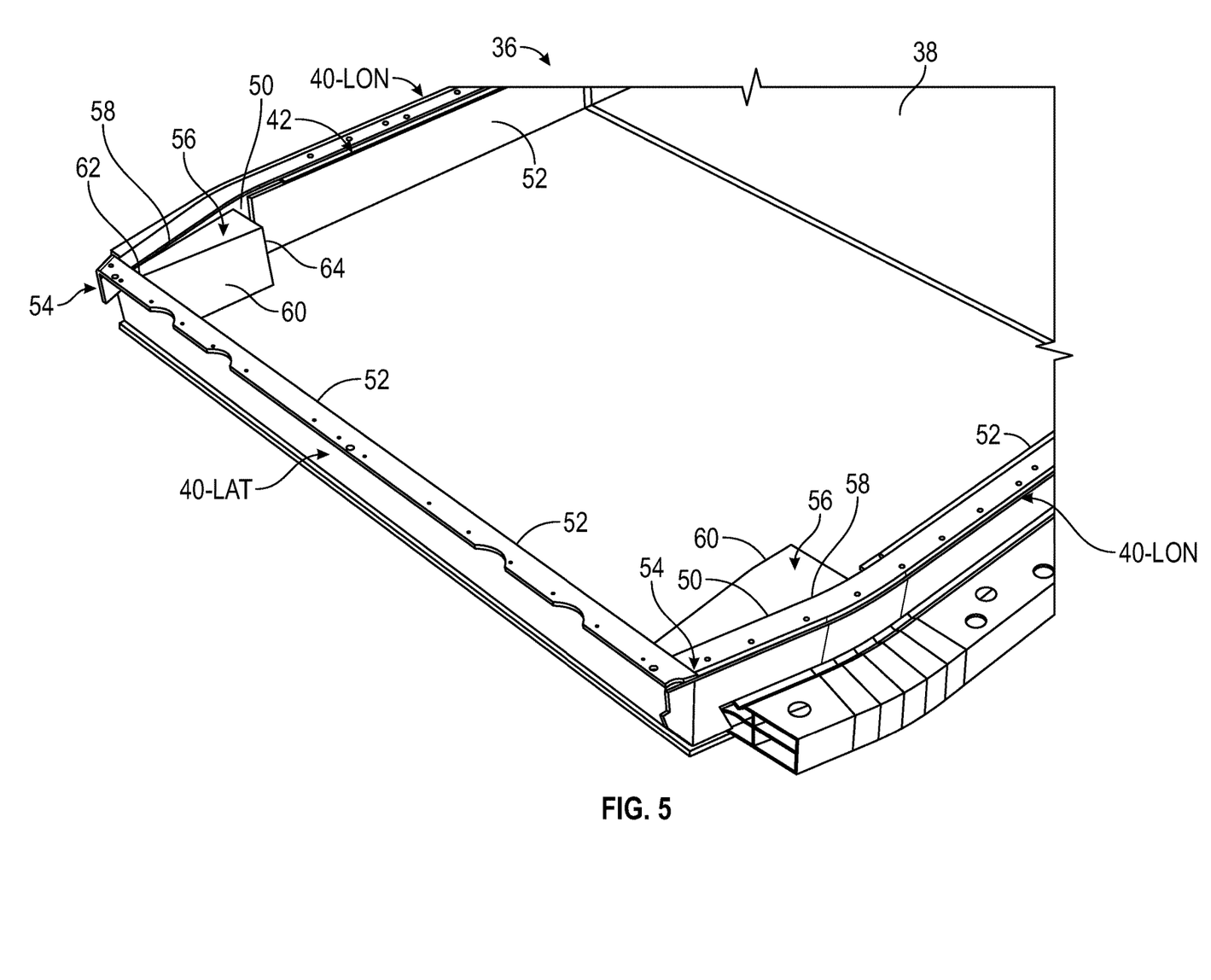
FIG. 5 is a partial perspective view of select portions of the traction battery pack of FIG. 4.
Figure 6:
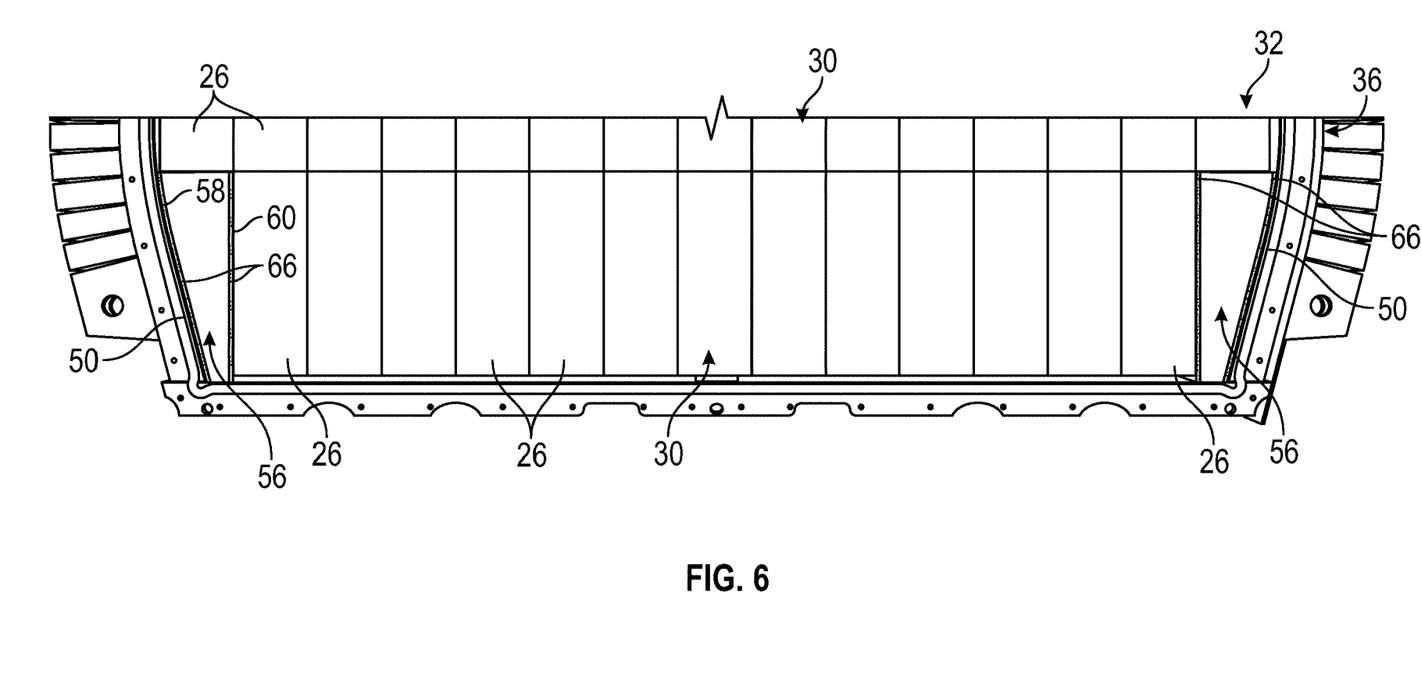
FIG. 6 is a top view of select portions of the traction battery pack of FIGS. 4-5.

FIGS. 4, 5, and 6, with continued reference to FIGS. 1-3, illustrate an exemplary design of an enclosure tray 36 of the traction battery pack 18. Portions of the cell matrix 32 are shown relative to the enclosure tray 36 in FIG. 6 but have been removed in FIGS. 4 and 5 for clarity.

The enclosure tray 36 may include an irregular shape and therefore may not exhibit a completely rectangular profile, or a rectangular profile that neatly accommodates the sum of the battery cells 26. For example, one or more of the side walls 40 of the enclosure tray 36 may include an irregularly shaped interior surface 50. Each irregularly shaped interior surface 50 may establish a portion of the cell-compressing opening 42 of the enclosure tray 36.

Each irregularly shaped interior surface 50 may include a non-flat or curved profile and may connect between flat portions 52 of the side walls 40. The flat portions 52 include a non-curved or flat profile. In the illustrated embodiment, each irregularly shaped interior surface 50 is disposed near a corner 54 of the enclosure tray 36 and establishes a tapered profile of the enclosure tray 36. The tapered profile may connect a longitudinally extending side wall 40-LON of the enclosure tray 36 to a laterally extending side wall 40-LAT of the enclosure tray 36. However, the enclosure tray 36 could include other irregular shapes within the scope of this disclosure.

Due to their irregular profile, the irregularly shaped interior surfaces 50 do not extend in parallel with battery cells 26 located at the longitudinal extents of the cell stacks 30/cell matrix 32 (see, e.g., FIG. 6). This can make supporting the cell stacks 30/cell matrix 32 relative to the enclosure tray 36 challenging. The traction battery pack 18 may therefore include one or more block inserts 56 for establishing an interface that "squares" the irregularly shaped interior surfaces 50 relative to the cell stacks 30/cell matrix 32. Among other benefits, the block inserts 56 may facilitate insertion of the cell stacks 30/cell matrix 32 into the cell-compressing opening 42 of the enclosure tray 36 and may further facilitate the transfer of compression loads imparted by the cell-compressing opening 42 to the cell matrix 32. The functionality provided by the block inserts 56 described herein may be particularly beneficial for traction battery packs that include cell-to-pack type battery systems because the array support structures traditionally provided within battery arrays have been largely eliminated from the cell-to-pack battery system 20, and the rigid cross members traditionally provided for establishing mounting points for securing battery cell groupings have been eliminated from the enclosure tray 36.

In an exemplary embodiment, two block inserts 56 are provided within the traction battery pack 18. However, a greater or fewer number of block inserts 56 could be provided within the scope of this disclosure depending on the actual shape of the enclosure tray 36.

The block insert 56 may include a first side face 58, a second side face 60, and a first end face 62 and a second end face 64 that connect between the first side face 58 and the second side face 60. The first side face 58 may include a first profile, and the second side face 60 may include a second, different profile. The first profile of the first side face 58 may be configured to match the profile of the irregularly shaped interior surface 50 of the enclosure tray 36, and the second profile of the second side face 60 may be configured to match the profile of one or more battery cells 26 of the cell stacks 30/cell matrix 32. Accordingly, in the exemplary embodiment, the first side face 58 includes a curved profile and the second side face 60 includes a substantially flat profile.

The first and second end faces 62, 64 may also each include a substantially flat profile. When the block insert 56 is positioned between the enclosure tray 36 and the cell stack 30/cell matrix, the first end face 62 may interface with the side wall 40-LAT of the enclosure tray 36, and the second end face 64 may interface with one or more battery cells 26 of an additional cell stack 30 of the cell matrix 32 (see, e.g., FIG. 6).

The block insert 56 may be secured in place by an adhesive 66 (schematically illustrated in FIG. 6). For example, the adhesive 66 may be applied between the first side face 58 of the block insert 56 and the irregularly shaped interior surface 50 of the enclosure tray 36, and may be further applied between the second side face 60 of the block insert 56 and an end face of one or more battery cells 26 of the cell stacks 30/cell matrix 32. Once cured, the adhesive 66 can retain the block insert 56 in place and add stiffness to the cell-to-pack battery system 20. The adhesive 66 may be a structural adhesive such as an epoxy or any other suitable adhesive. In other implementations, the adhesive 66 could include one or more sections of two-sided adhesive tape.

The block insert 56 may be a polymer-based component. For example, block insert 56 could be constructed out of a hollow core polymer that includes structural ribbing adapted for resisting battery cell expansion loads imparted by the battery cells 26 of the cell stacks 30/cell matrix 32. Exemplary materials include but are not limited to a thermoset (e.g., sheet molding compound, bulk molding compound, etc.), or a fiber reinforced thermoplastic (e.g., polyamide with glass fiber filler). In other implementations, the block insert 56 could be formed of a metal component such as a sheet metal stamping that is added inside and welded to a tray structure to square up the non-square or irregular surfaces.

The exemplary traction battery packs of this disclosure include an irregularly shaped enclosure and therefore provide features (e.g., block inserts) that allow irregularly shaped surfaces of the enclosure to be "squared" relative to a cell stack/cell matrix received therein. The block inserts provide solutions to various assembly complexities that can arise as a result of eliminating much of the array support structures and tray rigid cross members associated with convention traction battery packs.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
   an enclosure assembly including an enclosure tray, wherein the enclosure tray includes an irregularly shaped interior surface;
   a cell-to-pack battery system housed within the enclosure assembly and including a cell stack; and
   a block insert that establishes an interface between the irregularly shaped interior surface and the cell stack, wherein the block insert includes a first side face that interfaces with the irregularly shaped interior surface and a second side face that interfaces with the cell stack,
   wherein the first side face includes a first profile and the second side face includes a second, different profile.

2. The traction battery pack as recited in claim 1, wherein the block insert is secured to a battery cell that is located at a longitudinal extent of the cell stack.

3. The traction battery pack as recited in claim 2, wherein the cell stack establishes a cell row of a cell matrix.

4. The traction battery pack as recited in claim 1, wherein the enclosure tray provides a cell-compressing opening for compressing the cell stack.

5. The traction battery pack as recited in claim 4, wherein the irregularly shaped interior surface establishes part of the cell-compressing opening.

6. The traction battery pack as recited in claim 1, wherein the first profile is curved and the second profile is flat.

7. The traction battery pack as recited in claim 1, comprising an adhesive disposed between the first side face and the irregularly shaped interior surface and further between the second side face and the cell stack.

8. The traction battery pack as recited in claim 1, wherein the irregularly shaped interior surface includes a curved profile and connects between flat portions of the enclosure tray.

9. The traction battery pack as recited in claim 1, wherein the block insert is a polymer-based component.

10. The traction battery pack as recited in claim 9, wherein the polymer-based component includes a hollow core polymer having a structural ribbing.

11. A method, comprising:
    positioning a block insert between an irregularly shaped interior surface of an enclosure tray of a traction battery pack and a cell stack of a cell-to-pack battery system of the traction battery pack,
    wherein the block insert includes a curved profile that interfaces with the irregularly shaped interior surface and a flat profile that interfaces with the cell stack.

12. The method as recited in claim 11, wherein the block insert is positioned between the irregularly shaped interior surface and a battery cell of the cell stack.

13. The method as recited in claim 12, wherein the cell stack is part of a cell matrix of the cell-to-pack battery system.

14. The method as recited in claim 12, wherein the block insert is secured to both the irregularly shaped interior surface and the battery cell by an adhesive.

15. The method as recited in claim 11, wherein the block insert includes a first side face that interfaces with the irregularly shaped interior surface and a second side face that interfaces with the cell stack.

16. The method as recited in claim 15, wherein the block insert includes a first end face that interfaces with a flat portion of the enclosure tray and a second end face that interfaces with the cell stack or a second cell stack.

17. The method as recited in claim 15, wherein the first side face includes the curved profile and the second side face includes the flat profile.

18. A traction battery pack, comprising:
- an enclosure tray including an irregularly shaped interior surface;
- a cell stack received within the enclosure tray;
- a block insert that establishes an interface between the irregularly shaped interior surface and the cell stack; and
- an adhesive disposed between the block insert and the irregularly shaped interior surface and further between the block insert and the cell stack.

* * * * *